United States Patent [19]

Repp et al.

[11] Patent Number: 5,251,745
[45] Date of Patent: Oct. 12, 1993

[54] CONTAINER FOR INDEX PRINT SHEET AND CASSETTE

[75] Inventors: Timothy C. Repp, New Hartford; William H. Valls, Harwinton, both of Conn.; Robert J. Blackman, Rochester, N.Y.

[73] Assignee: Eastman Kokak Company, Rochester, N.Y.

[21] Appl. No.: 3,207

[22] Filed: Jan. 12, 1993

[51] Int. Cl.$^5$ .................. B65D 83/08; B65D 85/671
[52] U.S. Cl. .................................. 206/232; 206/225; 206/408; 206/409; 206/455
[58] Field of Search .............. 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 408, 409, 425, 444, 449, 450, 454–457, 459.5, 461–483, 559–565, 578, 582; 242/71, 71.1, 71.7; 281/21, 22, 26, 28, 31, 51; 434/429

[56] References Cited

U.S. PATENT DOCUMENTS

| 3,278,015 | 10/1966 | Bernstein | 206/47 |
|---|---|---|---|
| 3,402,501 | 9/1968 | Davis | 43/25.2 |
| 3,964,606 | 6/1976 | Hogg et al. | 206/395 |
| 4,095,694 | 6/1978 | Jost | 206/455 |
| 4,378,068 | 3/1983 | Bell | 206/461 |
| 4,819,794 | 4/1989 | Silverstein et al. | 206/495.5 |
| 5,020,669 | 6/1991 | Nakagoshi | 206/466 |
| 5,161,685 | 11/1992 | Harris et al. | 206/409 |

Primary Examiner—Jimmy G. Foster
Attorney, Agent, or Firm—Roger A. Fields

[57] ABSTRACT

A container is disclosed for a cassette capable of advancing a filmstrip with visible recorded images through a film passageway out of the cassette responsive to unwinding rotation of a spool which supports the filmstrip inside the cassette and for an index print sheet with printed pictures that match the visible images on the filmstrip. The container comprises a transparent sheet-like cover having a length and width larger than corresponding dimensions of the index print sheet to overlay the index print sheet and a sheet-like back having a length and width similar to the length and width of the cover to store the index print snugly between the cover and the back with the printed pictures on the index print sheet visible through the cover. The cover and/or the back includes an integrally formed nest for storing the cassette and having an access opening arranged to be aligned with the spool and a film egress opening arranged to be aligned with the film passageway when the cassette is located in the nest. Thus, the filmstrip can be advanced first out of the cassette and then out of the nest to examine the recorded images in relation to the printed pictures without removing the cassette from the nest or removing the index print sheet from between the cover and the back.

1 Claim, 3 Drawing Sheets

CONTAINER FOR INDEX PRINT SHEET AND CASSETTE

CROSS-REFERENCE TO RELATED APPLICATION

Reference is made to commonly assigned copending application Ser. No. 08/003,364, entitled CONTAINER FOR INDEX PRINT SHEET AND CASSETTE, and filed Jan. 12, 1993 in the name of R. J. Blackman.

BACKGROUND OF THE INVENTION

1. Field of the Invention

The invention relates to a container for a cassette which holds an image bearing medium having a plurality of images recorded on it and for an index print sheet on which are printed a plurality of pictures that match the plurality of images on the image bearing medium.

2. Description of the Prior Art

Generally, a processing laboratory gives the customer a processed photographic negative film and photographs which are enlarged and printed from the film. The negative film is usually cut into several sections, each one containing the same number of negatives and inserted in an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base, and must be removed from the pocket to access the floppy disk.

THE CROSS-REFERENCED APPLICATION

Cross-referenced application Ser. No. 08/003,364 discloses a container for a cassette which holds an image bearing medium having a plurality of images recorded on it and for an index print sheet on which are printed a plurality of pictures that match the plurality of images on the image bearing medium. The container comprises a transparent sheet-like cover having a length and width slightly larger than corresponding dimensions of the index print sheet to closely overlay the index print sheet, and a sheet-like back having a length and width similar to the length and width of the cover to store the index print snugly between the cover and the back with the plurality of pictures on the index print sheet visible through the cover. The back includes an integrally formed nest blown outward to hold the cassette out of the way of the index print sheet. The cassette must be removed from the nest to access the image bearing medium.

SUMMARY OF THE INVENTION

A container for a cassette capable of advancing a filmstrip with visible recorded images through a film passageway out of the cassette responsive to unwinding rotation of a spool which supports the filmstrip inside the cassette and for an index print sheet with printed pictures that match the visible images on the filmstrip, said container comprising:

a transparent sheet-like cover having a length and width larger than corresponding dimensions of the index print sheet to overlay the index print sheet; and a sheet-like back having a length and width similar to the length and width of the cover to store the index print snugly between the cover and the back with the printed pictures on the index print sheet visible through the cover; and at least one of the cover and the back includes an integrally formed nest for storing the cassette and having an access opening arranged to be aligned with the spool and a film egress opening arranged to be aligned with the film passageway when the cassette is located in the nest, whereby the filmstrip can be advanced first out of the cassette and then out of the nest to examine the recorded images in relation to the printed pictures without removing the cassette from the nest or removing the index print sheet from between the cover and the back.

DETAILED DESCRIPTION OF THE PREFERRED EMBODIMENT

Figure 1:
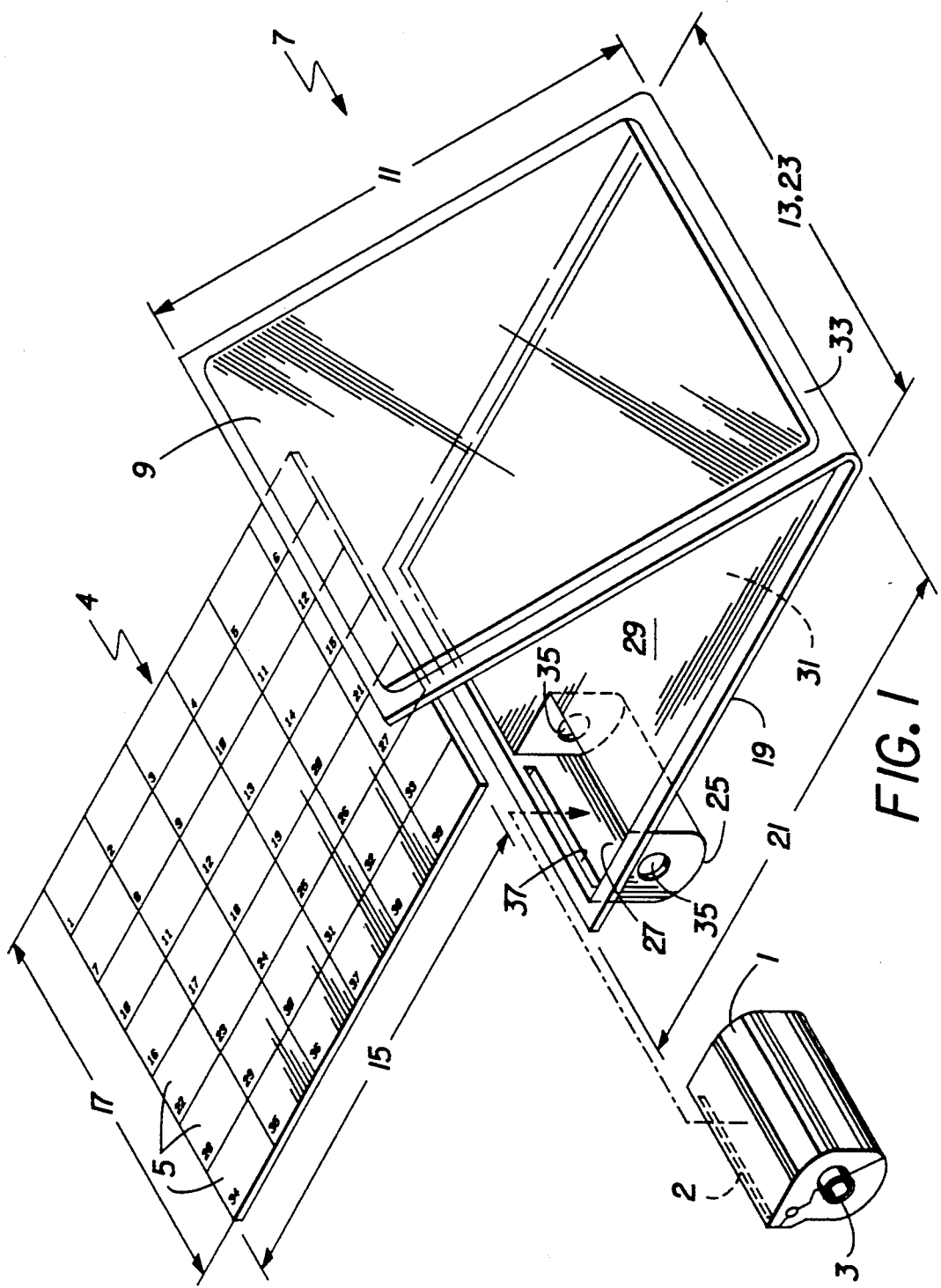
FIG. 1 is a perspective view of a container according to a preferred embodiment of the invention, showing how the container is opened to receive a cassette and an index print sheet.
Figure 3:
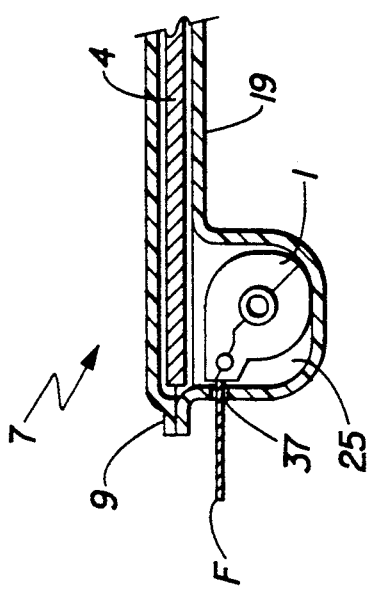
FIG. 3 is a sectional view of a portion of the container with the cassette and the index print sheet, showing how a filmstrip is advanced from the cassette and out of the container.

Referring to FIGS. 1 and 3, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 14, 1991 in the names of D. R. Zander and C. M. Csaszar. The cassette 1 is one that is capable of advancing a filmstrip F with successively numbered negatives, not shown, through a film passageway 2 out of the cassette responsive to unwinding rotation of a spool 3 which supports the filmstrip inside the cassette. Respective ends of the spool 3 are accessible from outside the cassette 1 to rotate the spool.

An index print sheet 4 similar to the one disclosed in U.S. Pat. No. 4,966,285, issued Oct. 30, 1990, has a series of pictures 5 printed on it that match the negatives on the filmstrip F inside the cassette 1. The pictures 5 are numbered in accordance with numbering of the negatives.

Figure 2:
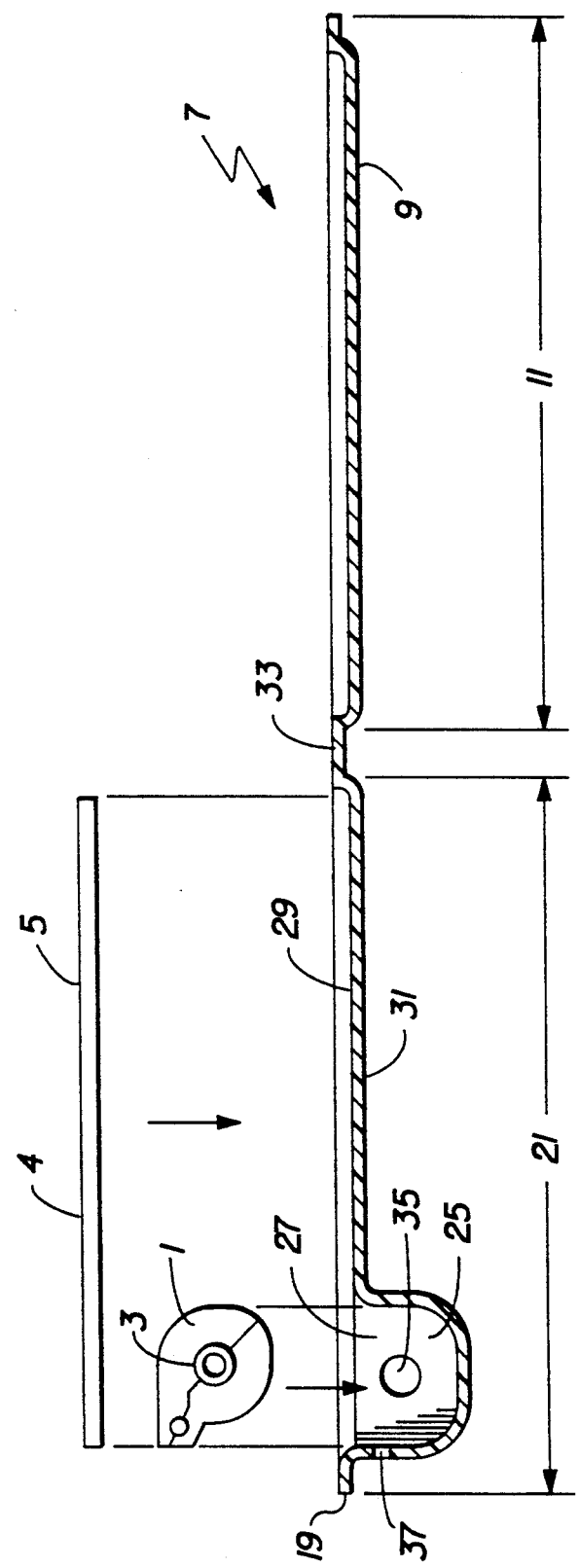
FIG. 2 is a sectional view of the container with the cassette and the index print sheet.

A display container 7 for the cassette 1 and the index print sheet 4 consists of a single piece of transparent molded thin plastic. A sheet-like cover or lid 9 of the container 7 has a length 11 and a width 13 slightly larger than corresponding dimensions 15 and 17 of the index print sheet 4 to closely overlay the index print sheet. See FIGS. 1 and 2. A sheet-like back or base 19 of the container 7 has a length 21 and a width 23 similar to the length 11 and the width 13 of the cover 9 to store the index print sheet 4 snugly between the cover and the back with the series of pictures 5 on the index print sheet visible only through the cover. The back 19 includes an integrally formed nest or receptacle 25 having a load/unload opening 27 at an inner side 29 of the back to receive the cassette 1 and projecting outward from an outer side 31 of the back to hold the cassette 1 out of the way of the index print sheet 4. A "living" hinge 33 connects the cover 9 and the back 19 to swing the cover away from the back to open and close the container 7. Known means, not shown, releasably secure the cover 9 and the back 19 to prevent the container 7 from being accidentally opened.

The back 19 at the nest 25 has pair of opposite, identical, access openings 35 arranged to be aligned with respective ends of the spool 3 (to permit the spool to be rotated) and a film egress opening 37 arranged to be aligned with the film passageway 2 (to permit the filmstrip to be advanced from the film passageway out of the nest) when the cassette 1 is located in the nest. See FIGS. 1-3. Consequently, the filmstrip F can be advanced first out of the cassette 1 and then out of the nest 19 to examine the negatives in relation to the printed pictures 5 without removing the cassette from the nest or removing the index print sheet 4 from between the cover 9 and the back as shown in FIG. 3.

The invention has been described with reference to a preferred embodiment. However, it will be appreciated that variations and modifications can be effected within the ordinary skill in the art without departing from the scope of the invention.

We claim:

1. A container for a cassette capable of advancing a filmstrip with visible recorded images through a film passageway out of the cassette responsive to unwinding rotation of a spool which supports the filmstrip inside the cassette and for an index print sheet with printed pictures that match the visible images on the filmstrip, said container comprising:

a transparent sheet-like cover having a length and width larger than corresponding dimensions of the index print sheet to overlay the index print sheet; and a sheet-like back having a length and width similar to the length and width of said cover to store the index print snugly between the cover and said back with the printed pictures on the index print sheet visible through the cover; and at least one of said cover and said back includes an integrally formed nest for storing the cassette and having an access opening arranged to be aligned with the spool and a film egress opening arranged to be aligned with the film passageway when the cassette is located in said nest, whereby the filmstrip can be advanced first out of the cassette and then out of said nest to examine the recorded images in relation to the printed pictures without removing the cassette from the nest or removing the index print sheet from between said cover and said back.

* * * * *